United States Patent [19]
Peavler

[11] Patent Number: 6,062,545
[45] Date of Patent: May 16, 2000

[54] TRAILER JACKING DEVICE

[76] Inventor: Derrick C. Peavler, 357 E. 2nd North, Green River, Wyo. 82935

[21] Appl. No.: 09/037,838

[22] Filed: Mar. 10, 1998

[51] Int. Cl.$^7$ ..................................................... B60S 9/02
[52] U.S. Cl. ..................................... 254/418; 254/DIG. 4; 254/418; 254/425
[58] Field of Search .......................... 254/425, 418–427, 254/93 VA, DIG. 4; 280/767, 507, 765.1, 491.5; 301/124.1, 124.2, 135, 125

[56] References Cited

U.S. PATENT DOCUMENTS

| | | | |
|---|---|---|---|
| 3,863,894 | 2/1975 | Mansi et al. | 254/418 |
| 4,589,632 | 5/1986 | Smith | 254/418 |
| 5,184,840 | 2/1993 | Edwards | 280/767 |
| 5,356,257 | 10/1994 | Nijenhuis | 280/767 |
| 5,560,629 | 10/1996 | Allard et al. | 280/507 |
| 5,695,204 | 12/1997 | Ford | 280/767 |
| 5,725,229 | 3/1998 | McWethy | 280/491.5 |
| 5,725,233 | 3/1998 | Gee et al. | 280/491.5 |

*Primary Examiner*—James G. Smith
*Assistant Examiner*—Lee Wilson
*Attorney, Agent, or Firm*—Mallinckrodt & Mallinckrodt

[57] ABSTRACT

Trailer jack attachment assemblies which do not extend below the lowermost frame member of the trailer body so as to avoid increasing obstruction from roads and rough terrain. Attachment is made to the trailer frame without destroying its structural integrity. Cross braces between laterally opposite attachments minimize localized twisting of individual frame members.

6 Claims, 3 Drawing Sheets

TRAILER JACKING DEVICE

BACKGROUND OF THE INVENTION

1. Field

The field of the invention is devices for leveling the bodies of vehicle drawn trailers when parked.

2. Prior Art

A recurrent problem in the use of vehicle drawn trailers is parking upon uneven ground, wherein the trailer tends to repose into a tilted position if allowed to rest upon its wheels. Often, standard axle jacks do not easily lift the trailer sufficiently to level the trailer condition. Even then, chocks or the like must be placed to support both wheel ends of the axles for parking. Several auxiliary devices have been proposed wherein a jack engageable member is secured to the trailer frame to extend laterally for purchase of jacks beside, rather than beneath, the trailer body. In U.S. Pat. No. 3,802,664, a crossbar is secured to side members of the trailer frame to extend beyond the outside trailer walls to provide a vertical jacking plate. The latter is engaged by a conventional automobile bumper jack. One serious shortcoming is that crossbar can only be secured below the frame members so that it projects downwardly, which is particularly vulnerable to dragging against the ground of rough roads and driveways. With this device, the bumper jack's grasp upon the plates is tenuous at best, with no positive lock between jack and plate.

Clearly, a need remains for a trailer attached apparatus for jacking the trailer to a laterally and longitudinally level position when parked on sloping and uneven ground.

BRIEF SUMMARY OF THE INVENTION

With the foregoing in mind, the shortcomings in the prior art trailer jacking devices are eliminated or substantially alleviated by the present invention, which provides at least one jack attachment assembly secured to a lowermost longitudinal member of a trailer body frame without extending below the plane of the bottom of such members. This avoids creating any additional obstruction to the use of the trailer on uneven roads and terrains. A jack attachment member extends horizontally beyond the associated trailer sidewall to there fit about a lifting member of a trailer jacking device or jack. Preferably, this jack lifting member extends horizontally inwardly, firmly secured such as by welding to the moving outer shell or housing of the jack, and telescopically joins the outwardly extending jack attachment member. This virtually eliminates the possibility of the trailer becoming disengaged from the jack during use.

Preferably, a forward and a rearward pair of jack attachment assemblies are used, each comprising a pair of horizontal tubular members each with an affixed vertical attachment flange at an innermost end connecting with and bolted to a respective trailer body frame longitudinal member. To relieve any localized twisting force upon the trailer body frame members from the jacking force, an end flanged cross-brace joins the jack attachment members of each pair, the end flanges each being bolted to the respective attachment flanges through a respective trailer body frame longitudinal member. Each cross-brace may comprise a monolithic beam-like member, or slideably associated segments rigidly secured together to span between the trailer body frame longitudinal members.

The jack attachment assemblies and cross-brace, therefore, provides a substantially stronger and more rigid support of the trailer body in jacked up position than is provided by any of the prior art methods and apparatus for this purpose.

BRIEF DESCRIPTION OF THE DRAWINGS

In the drawings, which represent the best modes presently contemplated for carrying out the invention.

DETAILED DESCRIPTION OF THE ILLUSTRATED EMBODIMENTS

Figure 1:
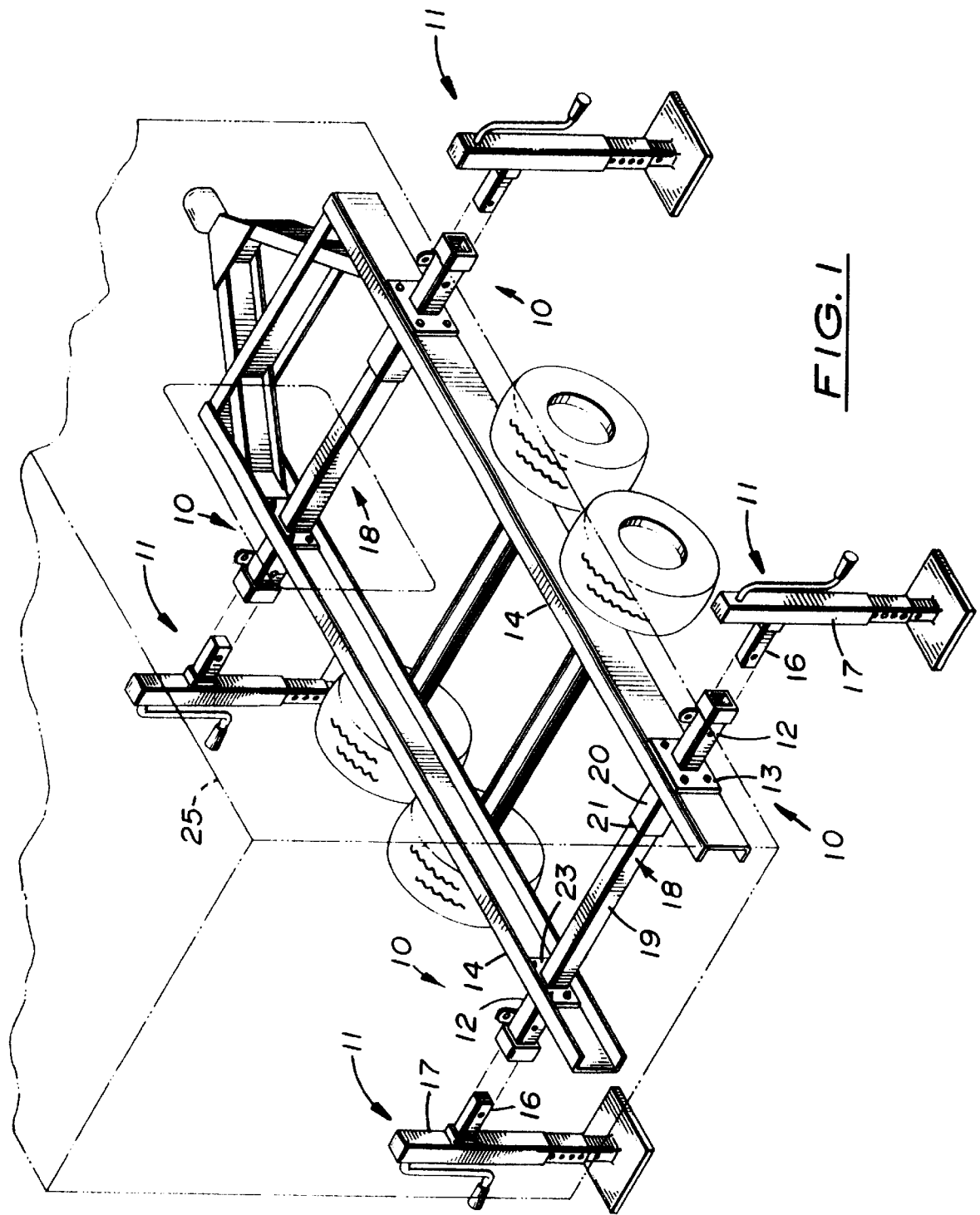
FIG. 1 is a perspective view of the frame of a trailer body with the jack attachment assemblies, showing four jacks in position for engagement of the jack attachment members, drawn to a reduced scale.
Figure 2:
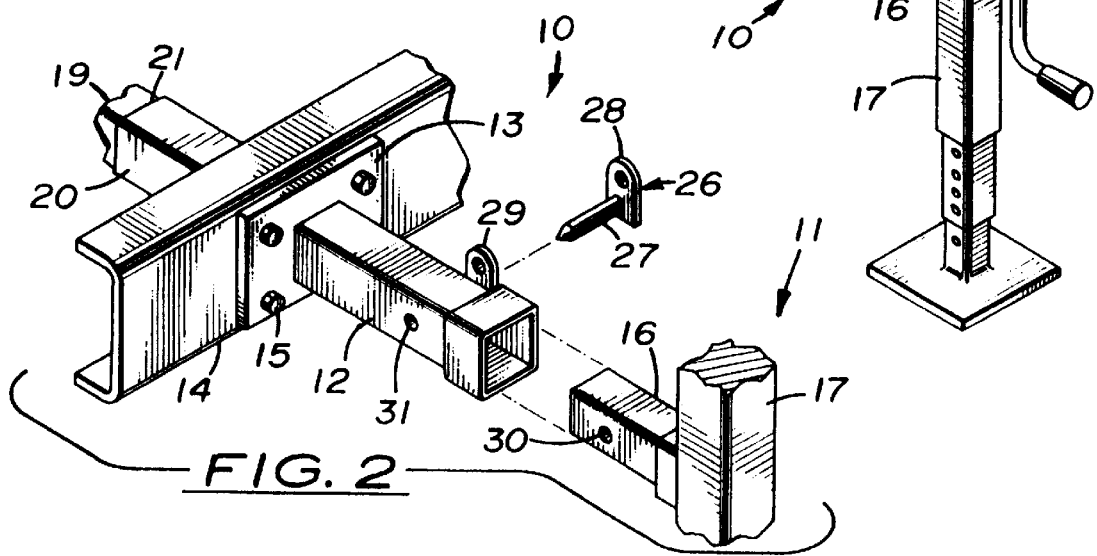
FIG. 2 a perspective view of a fragment of one of the trailer body frame longitudinal members with a fragment of the jack lifting member and associated jack, showing locking provisions to prevent inadvertent disengagement of the jack from the trailer body, drawn a reduced scale, larger than that of FIG. 1.

Front and rear pairs of jack attachment assemblies 10 provide for connection of lifting jacks 11 through respective jack attachment members or horizontal tubular members 12 welded to attachment flange members 13 in turn secured to body frame channels or longitudinal members 14 by bolts 15. A smaller lifting member or tubular member 16 welded to each of the outer housings 17 of the jacks 11 telescopically engages the tubular member 12 of the associated jack attachment assembly 10. (FIGS. 1 and 2)

Figure 3:
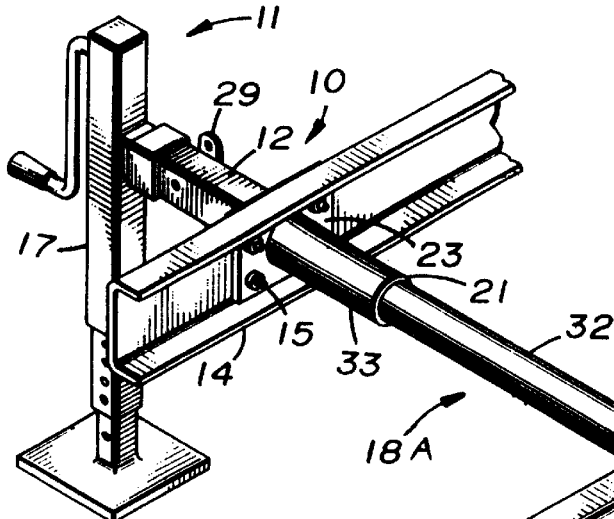
FIG. 3 a perspective view of a fragment of the trailer body frame, showing the attachment of the jacks and an end flanged cross brace of circular tubing, drawn to the approximate scale of FIG. 2.

A cross-brace assembly 18 resists local twisting of individual frame longitudinal members 14, and comprises telescoped box beam segments 19 and 20, which are rigidly joined as by weld 21 after installation. (FIGS. 1, 2, and 3) Cross brace assembly end flanges 23 and 24, jack attachment assembly attachment flanges 13 and body frame longitudinal members 14 are secured together by bolts 15 installed through matching holes, not shown.

Horizontal tubular members 12, when joined by the inserted tubular members tubes 16, provide very reliable connection to trailer body 25. However, a locking pin assembly 26 may be provided, comprising a locking pin 27 with tab 28, and a tab 29 welded to jack attachment assembly tubular member 12. Matching locking pin bores 30 and 31 in tubular member 16 and tubular member 12, respectively receive locking pin 27 to securely join jack 11 to trailer body frame longitudinal member 14, as indicated in exploded view in FIG. 2.

Figure 4:
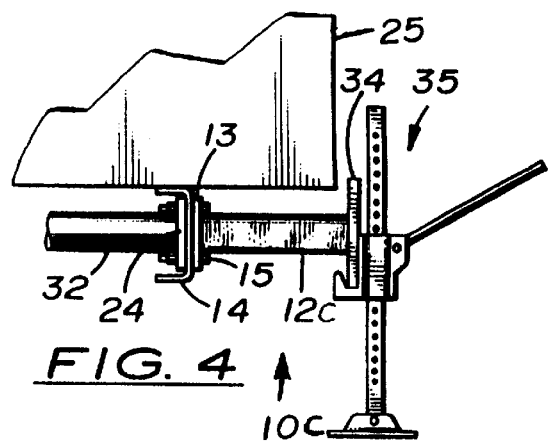
FIG. 4 a rear view of a fragment trailer body frame, showing a jack attachment assembly adapted for use of a standard bumper jack, drawn to a scale smaller than that of FIG. 3.
Figure 5:
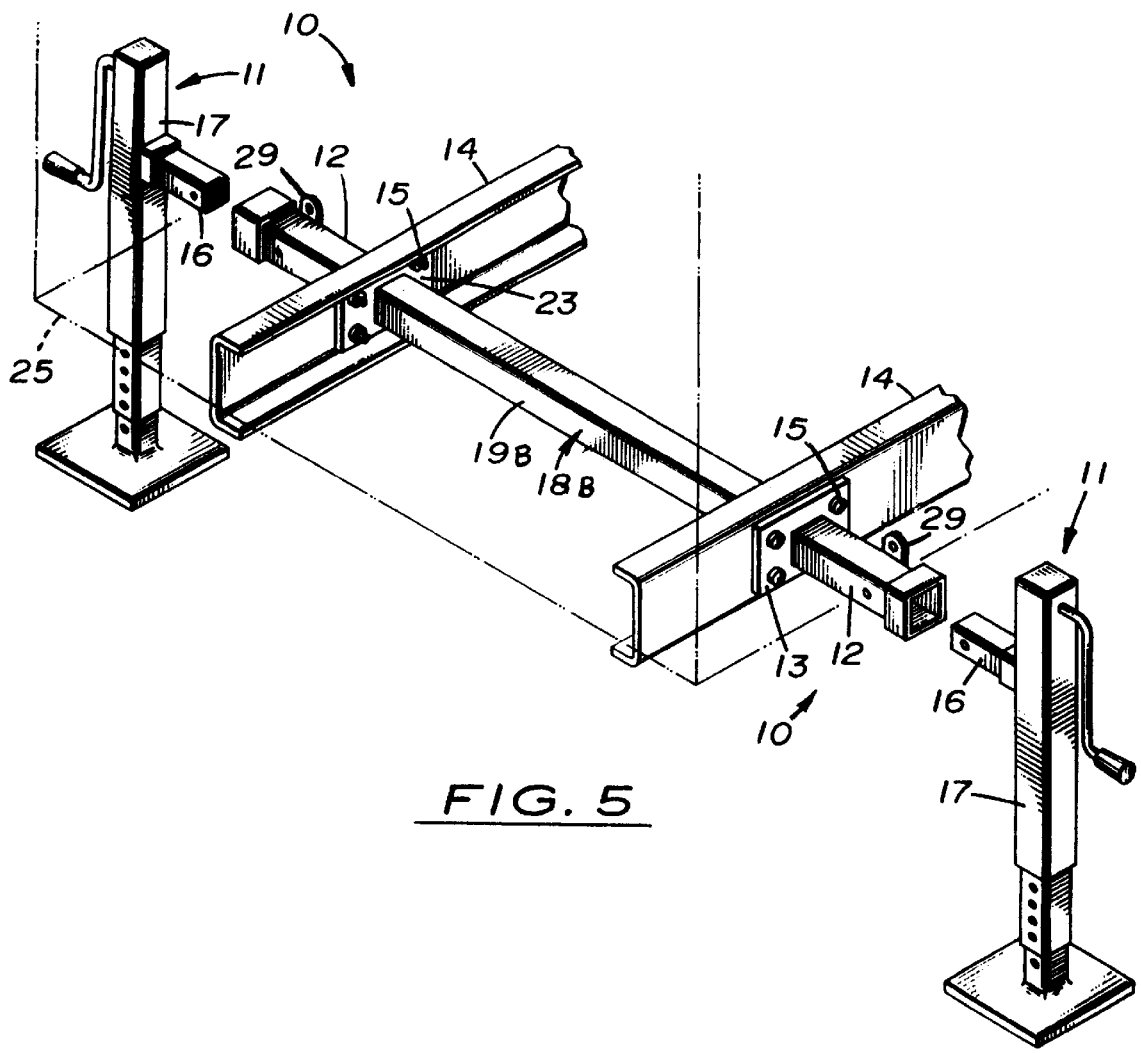
FIG. 5 a perspective view corresponding to FIG. 1, of a fragment thereof which incorporates a monolithic cross-brace.

The illustrated and described embodiment of jack attachment assembly 10 may be variously altered without departing from the spirit of the invention. For example, box beam segments 19 and 20 of cross-brace assembly 18 (FIGS. 1 and 2) may be replaced by telescoping pipe segments 32 and to comprise a cross-brace assembly 18A (FIG. 3) or by a single beam segment 19B to comprise a cross-brace assembly 18B. (FIG. 5) Likewise, the outer end of a tubular member 12C having no tab and hole 31 may carry a vertical plate 34, to permit use of a standard bumper jack 35. (FIG. 4) However, the lower edge of vertical plate 34 must not extend below the bottom flange of body frame longitudinal members channels 14.

The inventive apparatus may be embodied in other specific forms without departing from the spirit or essential characteristics thereof. The present apparatus is therefore to be considered illustrative and not restrictive, the scope of the invention being indicated by the appended claims rather than by the foregoing description and all equivalencies of the claims are therefore intended to be embraced therein.

What is claimed and desired to be secured by United States Letters Patent is:

1. An apparatus for attaching a jack to a pair of lowermost longitudinal members of a frame of a trailer body outside an adjacent trailer sidewall, wherein the entire apparatus is above a horizontal plane defined by the bottom of such longitudinal members, said apparatus comprising:

a pair of elongate horizontal members extending laterally outward of the frame, each having an innermost edge;

a pair of plate members, each permanently affixed to the innermost end of one of the respective horizontal members, each plate member shaped to abut one of the longitudinal members of the frame and having bolt holes for attachment thereto through matching holes provided in the respective longitudinal member; and a rigid cross brace between the longitudinal members of the trailer frame at the horizontal members.

2. The apparatus of claim 1, wherein the cross brace comprises an elongate horizontal connecting member carrying at each end a rigidly attached end flange adapted for attachment to the respective longitudinal member of the frame.

3. The apparatus of claim 2, wherein the flange members comprise a pair of plate members affixed to respective ends of the connecting member of the cross brace, each plate member shaped to abut the inside surface of the respective longitudinal member of the frame, and having bolt holes for attachment thereto, said hole size and location matching the holes through the respective longitudinal member and the plate member of the horizontal member.

4. The apparatus of claim 3, wherein the connecting member of the cross brace comprises two axially aligned telescoping segments and means joining such segments rigidly together.

5. The apparatus of claim 4, wherein the connecting member is a tube open at an outermost end thereof.

6. The apparatus of claim 3, wherein the connecting member of the cross brace comprises a single monolithic member that spans between the plate members of the cross brace.

* * * * *